(No Model.)
A. G. KENT.
HOUSE MOVING TRUCK.
No. 469,148. Patented Feb. 16, 1892.
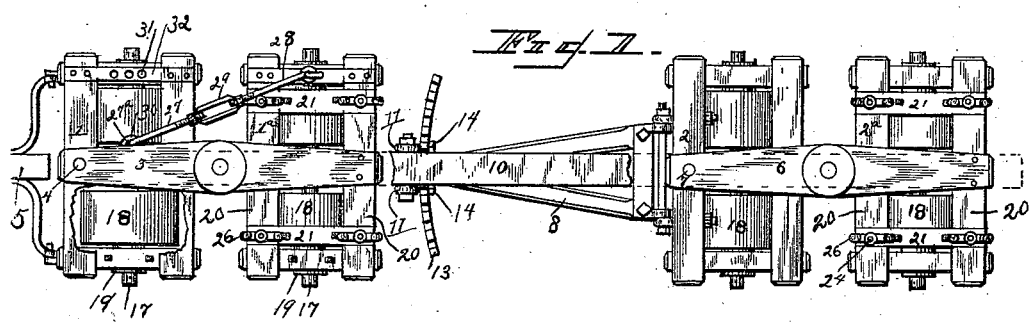
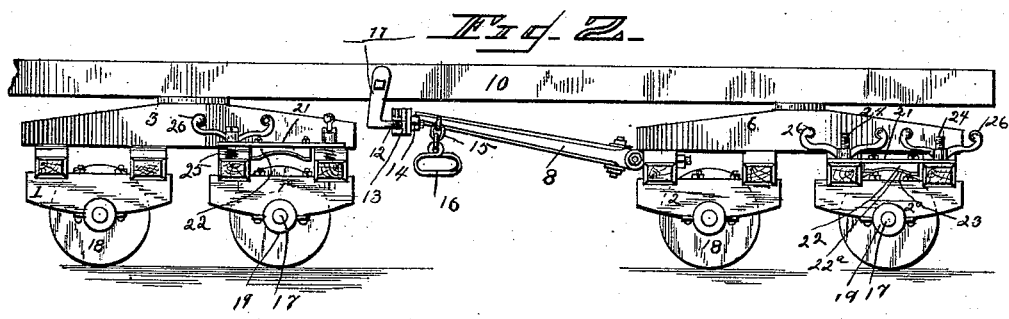
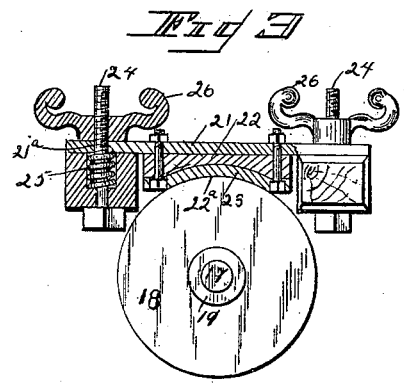
WITNESSES
C. S. Frye.
E. E. Lodge.
INVENTOR:
A. G. Kent
By W. J. Fitzgerald & Co.,
Attorneys.
THE NORRIS PETERS CO., PHOTO-LITHO., WASHINGTON, D. C.

UNITED STATES PATENT OFFICE.

ALEXANDER G. KENT, OF SOLON, IOWA.

HOUSE-MOVING TRUCK.

SPECIFICATION forming part of Letters Patent No. 469,148, dated February 16, 1892.

Application filed September 9, 1891. Serial No. 405,200. (No model.)

*To all whom it may concern:*

Be it known that I, ALEXANDER G. KENT, a citizen of the United States, residing at Solon, in the county of Johnson and State of Iowa, have invented certain new and useful Improvements in House-Moving Trucks; and I do hereby declare the following to be a full, clear, and exact description of the invention, such as will enable others skilled in the art to which it appertains to make and use the same.

My invention consists in a new and improved house-moving truck which is especially designed to be used in moving houses from one place to another; and this invention, in which are embodied many new and valuable features, will be hereinafter fully described and claimed.

Referring to the accompanying drawings, Figure 1 is a top plan view of my new and improved house-moving truck. Fig. 2 is a side elevation of the same. Fig. 3 is a vertical sectional view on a line with the brake-shoe and truck. Fig. 4 illustrates in detail the adjustable steering-gage.

Referring to the several parts by their designating-numerals, 1 $1^a$ indicate the forward trucks, and 2 $2^a$ the rear trucks, of my house-moving apparatus. The forward trucks 1 and $1^a$ are connected together by the cap-piece 3, the rear end of which is firmly bolted upon the frame of the truck $1^a$, while its outer end is pivotally secured by a king-bolt 4 upon the front cross-beam of the front truck 1. The truck 1 is provided with a tongue 5, to which the horses may be attached and by means of which the front truck can be turned, turning on its king-bolt to assist in turning the apparatus. The rear trucks 2 and $2^a$ are connected by the cap-piece 6, the rear end of which is bolted upon the frame of the rear truck $2^a$, while its forward end is pivotally secured by a king-bolt 7 upon the front cross-beam of the truck-frame 2. From the front of the truck 2 extends forward a tongue 8, from the free end of which projects a straight iron pin 9.

10 in the accompanying drawings represents a beam which connects the front and rear pairs of trucks and which may be the sill of the house which is being moved, the connecting cap-pieces 3 and 6 of the trucks being centrally and pivotally secured beneath the ends of the beam 10.

11 11 indicate the L-shaped supporting-arms of my new and improved gage, the long upper ends of which are provided with apertures $11^a$ to adapt them to be secured by a transverse bolt to the sides of a sill between the pairs of trucks just back of the forward trucks. The short lower ends of the supporting-arms are reduced and shouldered at 12 at their free ends to adapt them to fit through any of the series of slots $13^a$, formed in the lower part of a curved rack 13, and nuts 14 are screwed on the threaded ends 12 of the arms to hold the curved rack in position. It will be seen that by this construction the supporting-arms 11 can be moved nearer together or farther apart by placing their reduced ends 12 through the proper slots $13^a$ of the rack, and the device can thus be made to fit any-sized sill from four to eighteen inches thick. The iron pin 9, which projects from the front end of the tongue 8, fits in the notches of the curved rack 13, and it will be seen that the tongue 8 can be turned to either side to turn the truck 2 on its pivotal bolt, and that it will be held at the point to which it is adjusted by its end pin 9, engaging with the rack 13. The front end of the tongue 8 is provided with the short chains 15, having the hand-rings 16 at their free ends for convenience in lifting the end of the tongue in moving it from either side.

In each of the truck-frames 1 $1^a$ 2 $2^a$ are secured on a stout metal transverse shaft 17 two wide rollers 18, the width of the rollers being usually greater than their diameter. Each wheel-shaft 17 is preferably mounted at its center and both ends in a Babbitt-metal bearing-box 19, each hollow bearing-box being packed with waste and oil, by which means the bearings are rendered self-oiling. The rear trucks of each pair may be connected to their respective cap-pieces 3 6 by connecting-braces 20, arranged as shown.

Over each wheel of each rear truck of the front and rear pairs of trucks is mounted transversely a metal bar 21, to the under side of which is bolted a wooden brake-shoe 22, the under side of which is curved at $22^a$ to conform to the curvature of the wheel immediately below it, these curved surfaces being lined with iron 23.

24 indicates bolts, which pass up through the timbers of the truck-frames, with their upper ends passing loosely through apertures 21ª, formed in the bars 21. Coiled springs 25 encircle the upper ends of the bolts 24 below the bars 21 and operate to normally lift the bars 21 and hold the brake-shoes above the several wheels, while above the bars 21 wide hand-nuts 26 are mounted on the threaded upper ends of the bolts 24. It will now be seen when an incline of any degree is to be descended by my trucks when moving a house that by screwing down the heavy hand-nuts 26 the brake-shoes 22 will be pressed firmly down upon the rear wheels of the several pairs of trucks, and as two of the apparatus shown in Figs. 1 and 2 are employed under a house it will be seen that eight of these powerful brakes will be called into play, and I have found by experience that they will hold the trucks while descending the heaviest grade with a house mounted upon them. When level ground is again reached, the hand-nuts are unscrewed, when the coiled springs 25 will raise the brakes and release the rollers from their pressure.

In order that the carrying wheels or rollers may be held to their work in a line parallel with each other, I provide the rods 27 28, joined together by a turn-buckle 29, that the line of reach may be lengthened or shortened. The rod or section 28 is pivotally connected to the end of the frame, while the free end of rod 27 is bent at right angles to form the hook 27ª, which hook is adapted to be engaged by the staple 30 (when the front roller is to be held at any determined angle) or by the apertures 31, provided in the plate 32, when the rollers are to be locked in lines parallel with each other.

Having thus described my invention, what I claim, and desire to secure by Letters Patent, is—

1. In a house-moving truck, substantially as described, the combination, with a truck-frame and its supporting-roller, of the metal bar 21, having the apertures 21ª, the brake-shoes bolted to the under side of said bars, the bolts 24, passing up through the apertures 21ª and having their upper ends threaded, the coiled springs 25, encircling the bolts 24 beneath the bars 21, and the hand-nuts 26, mounted on the threaded ends of the bolts, substantially as specified.

2. The combination, with the beam 10, the curvilinear rack 13, having the series of slots 13ª, the arms 11, connected to the beam 10 and taking through the slots of the rack, and nuts mounted on the threaded ends of the said arms, of the rear truck 2, pivotally connected to the beam 10, and the tongue 8, connected to and extending forwardly from said rear truck and having a pin at its free end adapted to engage the rack 13, substantially as set forth.

3. The pivoted rear truck 2 and the tongue 8, connected to and extending forwardly from the rear truck and having a pin at its free end, in combination with the rack 13, having the series of slots 13ª, the arms 11, taking through the slots of the rack 13, and nuts mounted on the threaded ends of the said arms, substantially as and for the purpose set forth.

In testimony whereof I affix my signature in presence of two witnesses.

ALEXANDER G. KENT.

Witnesses:
L. M. LAWYER,
JACOB H. FISHER.